June 15, 1965 P. BLACHER 3,189,365

PORTABLE HAULERS

Filed Aug. 20, 1963

INVENTOR.
Philip Blacher
BY S. Stephen Baker
ATTORNEY

3,189,365
PORTABLE HAULERS
Philip Blacher, 709 Front St., Dunellen, N.J.
Filed Aug. 20, 1963, Ser. No. 303,235
5 Claims. (Cl. 280—47.24)

This invention relates to portable haulers for trailers or the like.

The owner of a boat or other vehicle often employs a trailer by which the vehicle is transported, the trailer usually having either 2 or 4 wheels. Such trailers are also used to transport any heavy load. Usually, the trailer is provided with a front tongue having connection means in the form of a hitch whereby the trailer may be hauled by an automobile. However, under some circumstances, the use of an automobile is awkward or unavailable.

Accordingly, with the above in mind, I have devised a portable, manually actuated hauler which is connected to the tongue of the trailer and by which means the trailer may be moved about without requiring an automobile.

The hauler of this invention is relatively small and light. Accordingly, when it is used to transport a much heavier device i.e., the trailer with or without a load, the hauler would be subjected to large forces possibly tending to overthrow it should the trailer waver, such as when it might run over a bump. I have solved this problem by providing a specially devised universal form of connection between the trailer tongue and hauler so that irregularities in the road surface are absorbed by the universal couplings and the hauler will not tend to tip. I have found that a device such as hereinafter described makes the manual transportation of trailers over a short distance both safe and easy.

The invention will be further understood from the following description and drawings in which.

Figure 1:
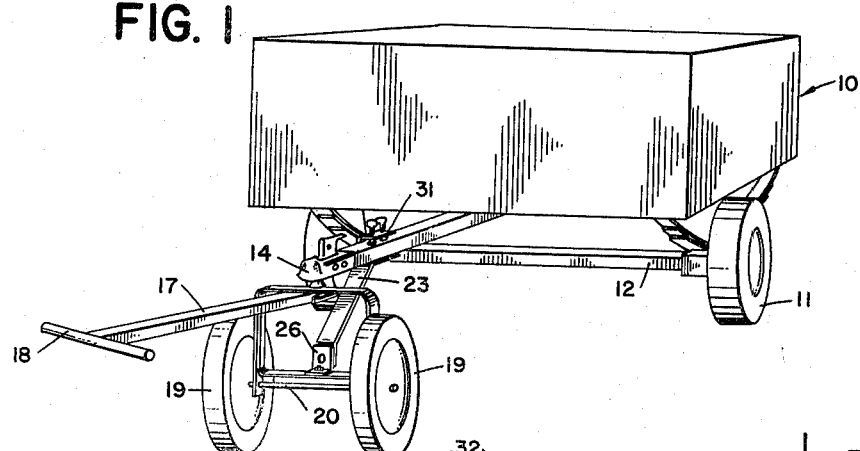
FIGURE 1 is a front perspective view of my portable hauler as attached to a trailer.
Figure 2:
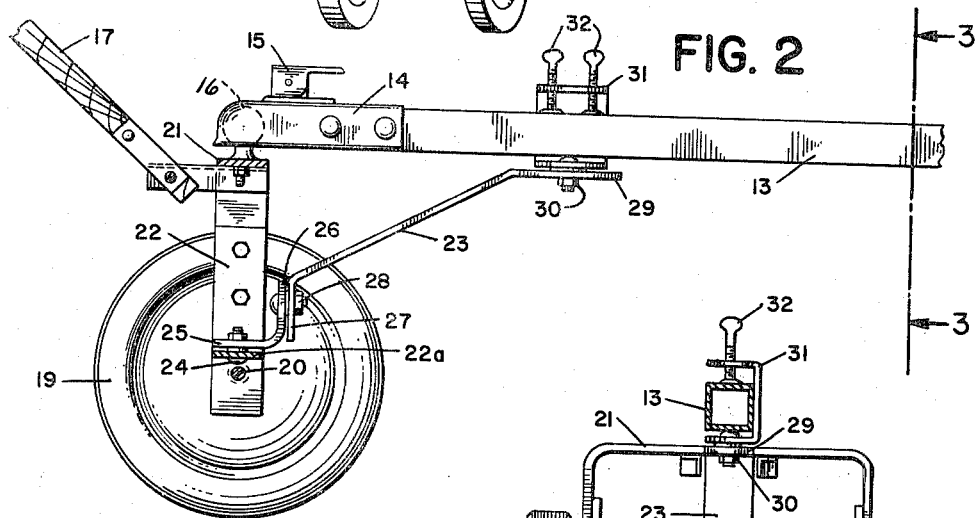
FIGURE 2 is an enlarged side view partly in section.
Figure 3:
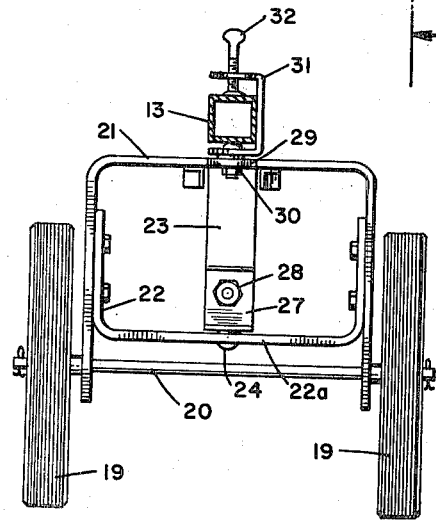
FIGURE 3 is a sectional view taken substantially along the line 3—3 of FIGURE 2.

The trailer 10, is conventional. In the specific form shown it includes a pair of wheels 11, an axle 12, and a front tongue 13. Tongue 13 is provided with a conventional hitch member 14 which includes a conventional lock device 15. Hitch 14 is also provided with the usual front socket to receive the ball hitch 16 as is conventional. Ball 16 is connected to the hauler, of course.

As above set forth, this invention concerns the construction of the hauler, which includes a pivotal handle 17 and a handlebar 18.

The hauler includes two road wheels 19 which may be about 12" in diameter, and which are disposed on the axle 20. Mounted on the axle 20, immediately inside the wheels 19, is a U-shaped frame member 21, whose upper portion normally extends a few inches above the wheels. Inasmuch as axle 20 extends through holes in the legs of U-shaped member 21, the frame member can pivot with respect to the axle.

Bolted to the inside of the legs of frame member 21 is the U-shaped frame member 22 which forms, together with frame member 21, a framework which is essentially rectangular.

My hauler includes a rearward tongue 23 which connects the framework to the trailer tongue 13. Such connection is effected by special pivots or swivels as will hereinafter be made clear.

Disposed centrally on horizontal crossbar 22a of member 22 is a pivot 24 to which is secured one leg 25 of an angle bracket. The other leg 26 is pivotally secured to a downwardly depending vertical arm 27 of tongue 23, the pivot therefor operating in a vertical plane in contrast to the pivot 24 which operates at a 90° angle therefrom, or in a horizontal plane.

The upper end of tongue 23 is provided with a horizontal plate 29 which is pivotable in a horizontal plane by pivot connection 30. Pivot 30 connects plate 29 to a locking bracket 31 which is U-shaped to admit trailer tongue 13 therein and is provided with set screws 32 for locking tongue 23 to tongue 13, although pivotal action in a horizontal plane is nevertheless permitted as above described. As illustrated the tongue 23 rises upwardly at an angle from its vertical arm so as to be connectable to trailer tongue 13 at about 1½ feet inwardly of the hitch end of tongue 13.

In use, the pivot 28 will operate in response to road irregularities where one wheel tips relative to the other, the frame member 21 and the ball then turning in the front socket of hitch 14. The pivot 30 operates when the hauler is swung abruptly relative to the tongue 13, the pivot 24 also operating at this time.

It has been found that a portable hauler such as above described makes the transportation of the trailer extremely easy and, in fact, a small child can easily maneuver the trailer when using this device. Regardless of irregularities of terrain, the combination of pivots as shown maintains the trailer wheels 19 on the ground, without tending to tip.

I have shown a preferred embodiment of my invention but it is obvious that many changes and omissions may be made therein without departing from its spirit.

What is claimed is:

1. A portable hauler for trailers or the like comprising a handle, a pair of road wheels, axle means for said road wheels, a framework disposed between said road wheels and including a horizontal crossbar, an angle bracket pivotally connected to said crossbar, a rearward tongue pivotally connected to said angle bracket, a clamping bracket on the rearward end of said tongue for connection to the front tongue of a trailer, and a hitch mounted on said framework and adapted to be engaged by a complementary hitch on said trailer tongue.

2. A portable hauler according to claim 1 and wherein said axle means comprises an axle connecting said wheels, said framework being substantially rectangular and being pivotally mounted on said axle, said angle bracket being connected to said crossbar by a pivot which operates in a horizontal plane, said rearward tongue being connected to said angle bracket by a pivot which operates in a vertical plane and said rearward tongue being connected to said clamping bracket by a pivot which operates in a horizontal plane.

3. A portable hauler for trailers or the like, said hauler comprising a handle, at least two road wheels, axle means for said wheels, a substantially rectangular framework disposed between the wheels and pivotally connected to said axle means, said framework including a horizontal crossbar, an angle bracket having one leg thereof pivoted to said crossbar, said bracket one leg pivot operating in a horizontal plane, a rearward tongue pivoted at one end thereof to the other leg of said angle bracket, said tongue pivot operating in a vertical plane, a clamping bracket pivotally connected to the other end of said tongue for connecting said tongue to the tongue of a trailer, and a trailer hitch disposed at the top portion of said framework.

4. A portable hauler according to claim 3 and wherein said rearward tongue is formed with a downwardly depending arm at its said one end, and is formed with a horizontal plate at its said other end, said rearward tongue rising at an angle from its downwardly depending arm up to its horizontal plate.

5. A portable hauler according to claim 4 and wherein the pivotal connection between said rearward tongue and said clamping bracket comprises a pivot operating in a horizontal plane.

References Cited by the Examiner
UNITED STATES PATENTS

| | | | |
|---|---|---|---|
| 2,015,726 | 10/35 | Pasin | 280—87.01 |
| 2,015,948 | 10/35 | Martinello | 280—87.01 |
| 2,723,130 | 11/55 | Andrews | 280—47.19 |
| 2,844,389 | 7/58 | Burnett | 280—414 X |
| 3,156,315 | 10/64 | Hawgood | 280—3 |

A. HARRY LEVY, *Primary Examiner.*

LEO FRIAGLIA, *Examiner.*